United States Patent
Ito et al.

(10) Patent No.: US 11,161,757 B2
(45) Date of Patent: Nov. 2, 2021

(54) WATER PURIFICATION DISPERSION, PRODUCTION METHOD FOR WATER PURIFICATION DISPERSION, AND WASTE WATER TREATMENT METHOD

(71) Applicant: DEXERIALS CORPORATION, Tokyo (JP)

(72) Inventors: Masahiko Ito, Tokyo (JP); Ryu Shimada, Tokyo (JP); Takanori Fujita, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/332,878

(22) PCT Filed: Sep. 5, 2017

(86) PCT No.: PCT/JP2017/031967
§ 371 (c)(1),
(2) Date: Mar. 13, 2019

(87) PCT Pub. No.: WO2018/051849
PCT Pub. Date: Mar. 22, 2018

(65) Prior Publication Data
US 2019/0359503 A1    Nov. 28, 2019

(30) Foreign Application Priority Data

Sep. 15, 2016  (JP) .............................. JP2016-180592
Aug. 30, 2017  (JP) .............................. JP2017-165391

(51) Int. Cl.
*C02F 1/28* (2006.01)
*C02F 1/52* (2006.01)
(Continued)

(52) U.S. Cl.
CPC ............ *C02F 1/286* (2013.01); *C02F 1/5272* (2013.01); *C02F 1/56* (2013.01);
(Continued)

(58) Field of Classification Search
CPC .... C02F 1/56; C02F 11/14; C02F 1/54; C02F 1/286; C02F 1/52
(Continued)

(56) References Cited

U.S. PATENT DOCUMENTS 3,985,651 A * 10/1976 Newman ................ C02F 1/5227
                                                                210/734
4,195,028 A *  3/1980 Agui .................... B01D 21/01
                                                                524/447
(Continued)

FOREIGN PATENT DOCUMENTS

CN       102583681 A    7/2012
EP       2 664 585 A1   11/2013
(Continued)

OTHER PUBLICATIONS

Shimizu et al, JP 2014-008428 English machine translation, pp. 1-6 (Year: 2014).*

(Continued)

*Primary Examiner* — Claire A Norris
(74) *Attorney, Agent, or Firm* — Buchanan, Ingersoll & Rooney PC

(57) ABSTRACT

Provided is a dispersion liquid for water purification, including: water; a powder of *Corchorus olitorius*; and a polymeric flocculant, wherein the powder of *Corchorus olitorius* and the polymeric flocculant are contained in a total amount of from 0.01% by mass through 0.5% by mass relative to the water, wherein the dispersion liquid for water purification has a viscosity of from 20 mPa·S through 500 mPa·S, and wherein a median diameter of a solid in the dispersion liquid (Continued)

"Intermediate jute No. 3": identification number Varieties Identification of Registration No. 1209006 in Anhui province for water purification is from 100 micrometers through 400 micrometers.

10 Claims, 1 Drawing Sheet

(51) Int. Cl.
  *C02F 1/56* (2006.01)
  *C02F 101/10* (2006.01)
  *C02F 101/14* (2006.01)
  *C02F 101/20* (2006.01)
  *C02F 101/22* (2006.01)

(52) U.S. Cl.
  CPC .... *C02F 2101/103* (2013.01); *C02F 2101/14* (2013.01); *C02F 2101/20* (2013.01); *C02F 2101/203* (2013.01); *C02F 2101/22* (2013.01)

(58) Field of Classification Search
  USPC .................................................. 210/730, 666
  See application file for complete search history.

(56) References Cited

U.S. PATENT DOCUMENTS

| 2007/0170115 | A1* | 7/2007 | Skillicorn | C02F 3/085 |
| | | | | 210/616 |
| 2013/0299433 | A1* | 11/2013 | Inagaki | B01J 20/24 |
| | | | | 210/730 |
| 2017/0121187 | A1 | 5/2017 | Kimura et al. | |
| 2017/0291835 | A1 | 10/2017 | Kimura et al. | |

FOREIGN PATENT DOCUMENTS

| JP | 11114313 A | 4/1999 |
| JP | 2011194384 A | 10/2011 |
| JP | 2011194385 A | 10/2011 |
| JP | 2014-008428 A | 1/2014 |
| JP | 2015231600 A | 12/2015 |
| JP | 2016073898 A | 5/2016 |
| JP | 2016163850 A | 9/2016 |
| TW | 201228946 A1 | 7/2012 |
| TW | 201615562 A | 5/2016 |
| WO | 2016052696 A1 | 4/2016 |

OTHER PUBLICATIONS

Extended European Search Report dated Feb. 17, 2020, by the European Patent Office in corresponding European Patent Application No. 17850752.1. (7 pages).
International Preliminary Report on Patentability (Form PCT/IPEA/409) dated Sep. 7, 2018, in the corresponding International Application No. PCT/JP2017/031967.
International Search Report (PCT/ISA/210) dated Oct. 31, 2017, by the Japan Patent Office as the International Searching Authority for International Application No. PCT/JP2017/031967.
Written Opinion (PCT/ISA/237) dated Oct. 31, 2017, by the Japan Patent Office as the International Searching Authority for International Application No. PCT/JP2017/031967.
First Notification of Office Action dated Sep. 27, 2020, by the Patent Office of the People's Republic of China in corresponding Chinese Patent Application No. 201780056660.3 and an English translation of the Notification. (23 pages).
Office Action dated Jan. 12, 2021, by the Taiwanese Patent Office in corresponding Taiwanese Patent Application No. 106131602 with an English translation of the Action. (17 pages).

\* cited by examiner

FIG. 1

"Intermediate jute No. 3": identification number Varieties Identification of Registration No. 1209006 in Anhui province

FIG. 2

"Intermediate kenaf": identification number Varieties Identification of Registration No. 1209001 in Anhui province

WATER PURIFICATION DISPERSION, PRODUCTION METHOD FOR WATER PURIFICATION DISPERSION, AND WASTE WATER TREATMENT METHOD

TECHNICAL FIELD

The present invention relates to a plant-derived dispersion liquid for water purification used for purification of water such as industrial wastewater, a method for producing the dispersion liquid for water purification, and a wastewater treatment method using the dispersion liquid for water purification.

BACKGROUND ART

In recent years, large amounts of waste liquids including environmentally hazardous substances such as metal ions and fluorine ions as inorganic ions have been generated in the processes for producing various products in plants.

Meanwhile, regulations on effluence of such inorganic ions have been becoming gradually strict. In order to comply with the effluent control, an inorganic ion removing method that can effectively remove inorganic ions from wastewater including the inorganic ions and can be carried out as easily and inexpensively as possible is demanded.

Hitherto, as the method for removing impurity ions from, for example, wastewater from plants, for example, a flocculating precipitation method, an ion-exchange method, a method for adsorption to an adsorbent such as activated charcoal, an electrosorption method, and a magnetic adsorption method have been proposed.

For example, as the flocculating precipitation method, there has been proposed a method of performing a step of adding a base to wastewater in which heavy metal ions are dissolved, to make the wastewater basic, insolubilize at least part of the heavy metal ions, and form a suspended solid matter, a step of adding an inorganic flocculant to the wastewater to make the suspended solid matter flocculate and settle, a step of adding a polymeric flocculant to the wastewater to turn the suspended solid matter to a macrofloc, and an adsorbing step of passing the wastewater through an adsorption layer containing a cation exchanger formed of a leafy vegetable such as mulukhiya and Japanese mustard spinach (see, e.g., PTL 1).

There has also been proposed a flocculating method of flocculating and separating particles in a suspension by means of mixed use or combined use of a flocculant containing at least any one of mulukhiya, a dried product of mulukhiya, and an extract of mulukhiya with a polymeric flocculant (see, e.g., PTL 2).

There have also been proposed a water-purifying agent formed of a granulated product containing a mixture of a plant powder and a polymeric flocculant, and a water-purifying method using the water-purifying agent (see, e.g., PTL 3).

For high-speed, stable wastewater-purifying treatments, it is indispensable to introduce an automated purification apparatus that is capable of performing wastewater-purifying treatments automatically. Particularly, for performing wastewater treatments in large amounts, an automated purification apparatus is an effective means. Accordingly, for use of an automated purification apparatus, it is desired to build a purifying treatment system that is capable of purifying a large amount of wastewater at a high-speed stably and exhibits a better purifying performance.

CITATION LIST

Patent Literature

PTL 1: Japanese Patent Application Laid-Open (JP-A) No. 2011-194385
PTL 2: JP-A No. 11-114313
PTL 3: JP-A No. 2016-73898

SUMMARY OF INVENTION

Technical Problem

In the case of performing wastewater-purifying treatment using a water-purifying agent containing a plant as described in PTLs 1 to 3 with an automated purification apparatus, in order to exhibit an excellent water-purifying performance, a conceivable method is to once produce a dispersion liquid by dissolving the water-purifying agent in water before feeding the water-purifying agent to wastewater, and feeding the dispersion liquid to the wastewater. This is because using a dispersion liquid to spread the water-purifying component throughout the wastewater is preferred to feeding a solid water-purifying agent directly to the wastewater.

Moreover, for performing wastewater-purifying treatment in an efficient assembly line operation according to a line production method, it is necessary to previously produce and stock the dispersion liquid. This is because it is often the case that the amount of generation of wastewater to be discharged from, for example, plants, changes day by day, and it is required to previously produce and stock the dispersion liquid in a certain amount, and use a necessary amount when needed.

Furthermore, in view of customers' needs, trading in the form of a dispersion liquid obtained by dissolving a water-purifying agent in water is conceivable and the form as a dispersion liquid is expected to have certain demand. Hence, it is required to provide a dispersion liquid that can be stored at low costs for a long term.

However, none of PTLs 1 to 3 contains a detailed description of a dispersion liquid to be fed to wastewater. Based on the descriptions in PTLs 1 to 3, it was impossible to produce a dispersion liquid to be fed to wastewater, which is obtained by dispersing a water-purifying agent in water, exhibits an excellent water-purifying performance, does not undergo water-purifying performance degradation even after a long term of storage, and can satisfy cost saving.

The present invention aims for solving the various problems described above and achieving the object described below. That is, the present invention has an object to provide a dispersion liquid for water purification that exhibits an excellent water-purifying performance, does not undergo water-purifying performance degradation even after a long term of storage, and can satisfy cost saving.

Solution to Problem

Means for solving the above problems are as follows.
<1> A dispersion liquid for water purification, including:
water;
a powder of *Corchorus olitorius*; and
a polymeric flocculant, wherein the powder of *Corchorus olitorius* and the polymeric flocculant are contained in a total amount of from 0.01% by mass through 0.5% by mass relative to the water, wherein the dispersion liquid for water purification has a viscosity of from 20 mPa·S through 500 mPa·S, and wherein a median diameter of a solid in the dispersion liquid for water purification is from 100 micrometers through 400 micrometers.

<2> The dispersion liquid for water purification according to <1>, wherein the *Corchorus olitorius* is "intermediate jute No. 4" under nationally identified hemp 2013, which is an identification number in Institute of Bast Fiber Crops, Chinese Academy of Agricultural Sciences.

<3> The dispersion liquid for water purification according to <1>, wherein the *Corchorus olitorius* is "intermediate jute No. 3" under varieties identification of registration No. 1209006 in Anhui province, which is an identification number in Institute of Bast Fiber Crops, Chinese Academy of Agricultural Sciences.

<4> The dispersion liquid for water purification according to <1>, wherein the *Corchorus olitorius* is "intermediate kenaf" under varieties identification of registration No. 1209001 in Anhui province, which is an identification number in Institute of Bast Fiber Crops, Chinese Academy of Agricultural Sciences.

<5> The dispersion liquid for water purification according to any one of <1> to <4>, wherein the polymeric flocculant is polyacrylamide.

<6> The dispersion liquid for water purification according to any one of <1> to <5>, wherein a composition ratio by mass between the *Corchorus olitorius* and the polymeric flocculant is from 9:1 through 1:9.

<7> The dispersion liquid for water purification according to any one of <1> to <6>, wherein the viscosity is from 150 mPa·S through 450 mPa·S.

<8> The dispersion liquid for water purification according to any one of <1> to <7>, wherein the median diameter is from 150 micrometers through 350 micrometers.

<9> A method for producing a dispersion liquid for water purification for producing the dispersion liquid for water purification according to any one of <1> to <8>, the method including:

dispersing a powder of a water-purifying agent in water to produce the dispersion liquid for water purification, wherein the powder of the water-purifying agent is produced by a producing method including:

a kneading step of mixing the powder of the *Corchorus olitorius* and the polymeric flocculant with each other, and kneading a resultant with addition of water, to obtain a kneaded product;

a molding step of molding the kneaded product, to form a molded body;

a drying step of drying the molded body, to obtain a dried product; and a grinding step of grinding the dried product.

<10> The method for producing a dispersion liquid for water purification according to <9>, wherein the water used for the dispersing has an electrical conductivity of 30 microsiemenses/cm or higher.

<11> A wastewater treatment method, including:

feeding the dispersion liquid for water purification according to any one of <1> to <8> to wastewater, to remove an inorganic unnecessary substance in the wastewater.

<12> The wastewater treatment method according to <11>, wherein the wastewater is wastewater including the inorganic unnecessary substance containing at least any one selected from the group consisting of nickel, fluorine, iron, copper, zinc, chromium, arsenic, cadmium, tin, and lead.

<13> The wastewater treatment method according to <12>, wherein the dispersion liquid for water purification is fed to the wastewater after 24 hours or longer passes from when the dispersion liquid for water purification is produced.

Advantageous Effects of Invention

The present invention can solve the various problems in the related art, achieve the object described above, and provide a dispersion liquid for water purification that exhibits an excellent water-purifying performance, does not undergo water-purifying performance degradation even after a long term of storage, and can satisfy cost saving.

BRIEF DESCRIPTION OF DRAWINGS

FIG. 1 is a diagram indicating an identification number of "intermediate jute No. 3" that is used in the present invention; and FIG. 2 is a diagram indicating an identification number of "intermediate kenaf" that is used in the present invention.

DESCRIPTION OF EMBODIMENTS (Dispersion Liquid for Water Purification)

A dispersion liquid for water purification of the present invention contains a powder of *Corchorus olitorius* and a polymeric flocculant. That is, the powder of *Corchorus olitorius* and the polymeric flocculant are dispersed in water.

The total content of the powder of *Corchorus olitorius* and the polymeric flocculant in the dispersion liquid for water purification is from 0.01% by mass through 0.5% by mass relative to the water serving as a dispersion medium.

The viscosity of the dispersion liquid for water purification is from 20 mPa·S through 500 mPa·S.

The median diameter of a solid in the dispersion liquid for water purification is from 100 micrometers through 400 micrometers.

The dispersion liquid for water purification of the present invention satisfying the above requirements is a dispersion liquid for water purification that exhibits an excellent water-purifying performance, does not undergo water-purifying performance degradation even after a long term of storage, and can satisfy cost saving.

As a result of studies into wastewater-purifying treatment using a dispersion liquid, the present inventors have found that the viscosity of the dispersion liquid when a plant powder and a polymeric flocculant are dissolved varies depending on the kind of the water of the dispersion liquid, and have also found that the viscosity of the dispersion liquid tends to be low when *Corchorus olitorius* is used as a plant powder.

Then, the present inventors have found that difference in the viscosity of the dispersion liquid is influential to the wastewater-purifying performance, and that the viscosity of the dispersion liquid needs to be high to a certain degree in order to obtain a good purifying performance.

A low viscosity makes a solid in the dispersion liquid likely to settle. Therefore, for example, when a few days has passed from when the dispersion liquid was produced, the component effective for water purification has precipitated to the bottom of the container and may be left behind within the container when the dispersion liquid is injected into a wastewater tank, making it impossible to obtain a sufficient water-purifying action as a result. This phenomenon has been particularly outstanding when tap water or ground water (containing various kinds of ions) is used for producing the dispersion liquid. With the use of expensive distilled water as a dispersion medium, it is possible to cope with the problem related with the viscosity to some extent, but there is a problem that the cost is high.

Practically, the scale of the dispersion liquid for water purification to be fed into a wastewater tank is from some tens of liters through some hundreds of liters. Therefore, the dispersion liquid for water purification is stored in, for example, a drum having a capacity of, for example, about 200 L. In such a case, the above-described problem of settling of the solid that occurs when the viscosity of the dispersion liquid for water purification is low is outstanding. In the case of feeding the dispersion liquid for water purification into the wastewater tank immediately after the dispersion liquid for water purification is produced (for example, within a few minutes), the above-described settling of the solid rarely becomes a problem. However, it is often the case that the amount of generation of wastewater changes day by day, and it is practical to previously produce and stock the dispersion liquid in a certain amount and use a necessary amount when needed. Hence, a dispersion liquid for water purification that can be suppressed from settling of the solid even after a long term of storage is required.

Hence, as a result of earnest studies, the present inventors have found that with prescription of the content of the powder of *Corchorus olitorius* and the polymeric flocculant in the dispersion liquid, the median diameter of the solid in the dispersion liquid, and the viscosity of the dispersion liquid, a dispersion liquid with these values falling within desired ranges can be a dispersion liquid for water purification that can be suppressed from settling of the solid even after a long term of storage while keeping a good purifying action to wastewater, and does not undergo water-purifying performance degradation even when relatively inexpensive tap water or ground water is used.

A specific configuration of the dispersion liquid for water purification will be described below.

<Powder of *Corchorus olitorius*>

The powder of *Corchorus olitorius* has a high cation exchange function and has pores that can adsorb microflocs in wastewater containing the inorganic ions. Therefore, the powder of *Corchorus olitorius* can be suitably used.

Any parts of *Corchorus olitorius* such as leaves, stalks, or roots can be used. However, parts of leaves can be suitably used.

Among the species of *Corchorus olitorius*, *Corchorus olitorius* produced in Nansha City of China, or "intermediate jute No. 4" under nationally identified hemp 2013, "intermediate jute No. 3" under varieties identification of registration No. 1209006 in Anhui province, "intermediate jute No. 1" under XPD005-2005, and "intermediate kenaf" under varieties identification of registration No. 1209001 in Anhui province, which are identification numbers in Institute of Bast Fiber Crops, Chinese Academy of Agricultural Sciences, can be suitably used. The "intermediate jute No. 4", the "intermediate jute No. 3", and the "intermediate kenaf" are more preferable, and the "intermediate jute No. 4" is particularly preferable.

The identification number of the "intermediate jute No. 3" is indicated in FIG. 1. The identification number of the "intermediate kenaf" is indicated in FIG. 2.

The "intermediate jute No. 4" has the following properties.

Agricultural product type: Jute

In order to obtain a powder of the plant, for example, a dry plant may be coarsely ground and then finely ground. In this way, a plant powder having a desired size (for example, with a number average particle diameter of 400 micrometers or less) may be obtained.

Further, in the present invention, the ground powder may be classified with a classifier such as a vibration screen or a wind ratio classifier. This enables the median diameter of the solid in the dispersion liquid to be adjusted to a desired range.

<Polymeric Flocculant>

The polymeric flocculant is not particularly limited so long as the polymeric flocculant exhibits an effect of removing the inorganic unnecessary substance in wastewater like the *Corchorus olitorius* described above. Examples of the polymeric flocculant include polyacrylamide (PAM), a salt obtained by partially hydrolyzing polyacrylamide, sodium alginate, sodium polyacrylate, and CMC sodium salt. Among these polymeric flocculants, polyacrylamide is preferable for use. As the polyacrylamide, for example, commercially available products FLOPAN AN 995SH, FA 920SH, FO 4490, AN 923, and AN 956 (available from SNF Japan Co., Ltd.) can be used.

<Other Additives>

The dispersion liquid for water purification may contain additives such as an antiseptic, a filler, a thickener, a colorant, and a thixotropy imparting agent as other additives.

<Properties of Dispersion Liquid for Water Purification>

<<Content of Powder of *Corchorus Olitorius* and Polymeric Flocculant>>

A total content of the powder of *Corchorus olitorius* and the polymeric flocculant is from 0.01% by mass through 0.5% by mass and more preferably from 0.05% by mass through 0.3% by mass relative to water serving as a dispersion medium.

The mixing ratio between the powder of *Corchorus olitorius* and the polymeric flocculant is from 9:1 through 1:9 on a mass ratio basis.

<<Viscosity of Dispersion Liquid for Water Purification>>

The viscosity of the dispersion liquid for water purification is from 20 mPa·S through 500 mPa·S, more preferably from 100 mPa·S through 450 mPa·S, and particularly preferably from 150 mPa·S through 450 mPa·S.

When the viscosity is lower than 20 mPa·S, the solid precipitates in the dispersion liquid.

On the other hand, when the viscosity is higher than 500 mPa·S, the degree of mixing with wastewater will be troubled, to disturb sufficient exhibition of the water-purifying function.

The viscosity is a value at the temperature during storage. The temperature is typically from 5 degrees C. through 30 degrees C. and more preferably about room temperature (around 23 degrees C.).

The viscosity can be measured with a TVC-7 type viscometer (B-type viscometer) available from Toki Sangyo Co., Ltd., at room temperature of 23 degrees C., with a rotor No. 1.

<<Median Diameter of Solid in Dispersion Liquid for Water Purification>>

The median diameter of the solid in the dispersion liquid for water purification is from 100 micrometers through 400 micrometers and more preferably from 150 micrometers through 350 micrometers.

When the median diameter of the solid is less than 100 micrometers, the water-purifying function is insufficient. On the other hand, when the median diameter of the solid is greater than 400 micrometers, the solid precipitates in the dispersion liquid.

The solid in the dispersion liquid is mainly due to an undissolved portion of the powder of *Corchorus olitorius*. Hence, in order that the median diameter may be adjusted to the desired range, the condition for grinding *Corchorus olitorius* may be adjusted, the powder of *Corchorus olitorius* obtained by grinding may be classified, or the classifying condition may be adjusted. Alternatively, during production of a granulated product containing a mixture of the powder of *Corchorus olitorius* and the polymeric flocculant, the condition for grinding the granulated product may be adjusted, the powder of the granulated product obtained by grinding may be classified, or the classifying condition may be adjusted.

In the present invention, it is preferable to adjust the median diameter of the solid to the desired range, by performing both of a step of classifying the powder of *Corchorus olitorius* and a step of classifying a powder of a granulated product formed of the powder of *Corchorus olitorius* and the polymeric flocculant.

Here, the median diameter (also referred to as d50) refers to a particle diameter plotted at 50% of the total number of particles of the solid when the solid is plotted by the particle diameter (i.e., a particle diameter at which particles with larger diameters and particles with smaller diameter are divided equally in quantity).

The median diameter of the solid in the dispersion liquid can be measured with a MORPHOLOGI G3 measuring instrument available from Malvern Instruments (Spectris Co., Ltd.), using a ten-fold diluted liquid of the dispersion liquid sample.

(Method for Producing Dispersion Liquid for Water Purification)

A method for producing a dispersion liquid for water purification of the present invention (hereinafter may also be referred to as producing method of the present invention) includes a dispersing step of dispersing the powder of *Corchorus olitorius* and the polymeric flocculant in water in order that the dispersion liquid for water purification of the present invention described above can be obtained.

In this case, the method for dispersing the powder of *Corchorus olitorius* and the polymeric flocculant is not particularly limited so long as the obtained dispersion liquid for water purification satisfies <Properties of dispersion liquid for water purification> described above. For example, it is possible to obtain the dispersion liquid for water purification, by dispersing the powder of *Corchorus olitorius* and the polymeric flocculant separately in water. However, in this case, it is necessary to use distilled water as a dispersion medium in order to obtain a desired viscosity. Hence, the mode described below is more preferable in order to obtain the dispersion liquid for water purification of the present invention without limitation on the kind of the dispersion medium (water).

That is, in order to obtain the dispersion liquid for water purification, once producing a water-purifying agent containing the powder of *Corchorus olitorius* and the polymeric flocculant and dispersing a powder of the water-purifying agent in water is preferred to dispersing the powder of *Corchorus olitorius* and the polymeric flocculant separately in water.

It is preferable that the water-purifying agent be a water-purifying agent formed of a granulated product obtained by kneading the powder of *Corchorus olitorius* and the polymeric flocculant. For example, such a water-purifying agent can be obtained by a producing method including a kneading step of mixing the powder of *Corchorus olitorius* and the polymeric flocculant with each other and kneading the resultant with addition of water to obtain a kneaded product, a molding step of molding the kneaded product to form a molded body, a drying step of drying the molded body to obtain a dried product, and a grinding step of grinding the dried product.

Further, it is preferable to provide a classifying step of classifying the granulated product with a sieve after the grinding step.

In the molding step, for example, the kneaded product is molded by an arbitrary molding method, to form a molded body.

In the drying step, the obtained molded body may be dried at a temperature of from 80 degrees C. through 150 degrees C. for from 2 hours through 12 hours with, for example, a multistage hot air drier.

The molded body may be fed to the grinding step when the molded body is dried to a water content of, for example, about 30%.

In a preferable mode, the drying step is applied according to a procedure of drying the molded body obtained in the molding step and grinding the dried molded body next. However, for example, a procedure of grinding the molded body obtained in the molding step and applying the drying step next may be performed to obtain the granulated product.

In the grinding step, grinding may be performed with a grinder such as a pneumatic ultra-fine grinder.

In the classifying step, the classifying condition may be adjusted such that the ground powder is classified with a classifier such as a vibration screen or a wind ratio classifier in a manner that the median diameter of the solid in the dispersion liquid for water purification will be in a desired range.

For the dispersion liquid for water purification obtained by once producing a water-purifying agent and dispersing a powder of the water-purifying agent in water in the way described above, the dispersion medium (water) is not particularly limited. In addition to pure water (distilled water), water having an electrical conductivity of 30 microsiemenses/cm or higher may be used. A desired viscosity can be obtained also when any of these dispersion media is used. Therefore, relatively inexpensive tap water or ground water can be used.

Even when tap water or ground water is used for the dispersion liquid, the inorganic ion concentration in wastewater can be reduced to equal to or lower than a desired concentration, and a high water-purifying performance can be exhibited. Further, even through a long term of storage, settling of the solid in the dispersion liquid can be suppressed.

(Wastewater Treatment Method)

A wastewater treatment method of the present invention is for removing an inorganic unnecessary substance in wastewater by feeding the dispersion liquid for water purification of the present invention described above to the wastewater.

Examples of the inorganic unnecessary substance include an inorganic unnecessary substance that contains at least any one selected from the group consisting of nickel, fluorine, iron, copper, zinc, chromium, arsenic, cadmium, and lead.

With the use of the dispersion liquid for water purification of the present invention, settling of the solid in the dispersion liquid for water purification can be suppressed even through a long term of storage, and an excellent water-purifying performance can hence be exhibited even after a long term of storage. Accordingly, there is no need for feeding the dispersion liquid for water purification to wastewater immediately after the dispersion liquid for water purification is produced, but an excellent water-purifying performance can be exhibited even when the dispersion liquid for water purification is fed to wastewater after 24 hours or longer has passed.

The wastewater treatment method of the present invention will be specifically described.

For example, it is possible to add the dispersion liquid for water purification obtained by the producing method of the present invention, after an insolubilizing step of adding a base to wastewater to make the wastewater basic, insolubilize at least part of the heavy metal ions, and form a suspended solid matter.

The dispersion liquid for water purification is fed to the wastewater at a ratio of from 0.5 ppm through 15 ppm, to make the inorganic unnecessary substance flocculate and settle, and the settled, separated precipitate is removed. In this way, the wastewater is purified.

EXAMPLES

The present invention will be described below by way of Examples. However, the present invention should not be construed as being limited to these Examples.

Example 1

Nickel sulfate hexahydrate was dissolved in pure water, to produce an aqueous solution (800 g) containing nickel ion (50 mg/L) as wastewater to be used for experiment (virtual wastewater).

Next, caustic soda was supplied to the wastewater at pH of 10, and the resultant was stirred to insolubilize nickel. The nickel ion concentration in the supernatant of the wastewater was 2 mg/L.

<Water-Purifying Agent>

Next, *Corchorus olitorius* (produced in China, Guangzhou) was used as a plant, and polyacrylamide (PAM) was used as a polymeric flocculant.

The plant was dried by sun drying until a water content became 5% by mass or lower, then ground with an atomizer (HAMMER MILL, available from Masuko Sangyo Co., Ltd.), and sieved to remove (cut) particles less than 100 micrometers and greater than 400 micrometers, in order to only use particles having a particle diameter in a range of from 100 micrometers through 400 micrometers.

A granulated product 1 was obtained by a producing method described below, and the granulated product 1 was used as a water-purifying agent 1.

<<Method for Producing Water-Purifying Agent>>

To a solid in which the plant powder and the polymeric flocculant were combined, water was added in five times as great a mass as the mass of the solid, to obtain a kneaded product (plant powder+polymeric flocculant+water=30 kg). The kneaded product was put in a planetary mixer (available from Aicohsha Mfg. Co., Ltd., MIXER ACM-110, with a capacity of 110 L), and kneaded with a shear applied under mixing conditions of a rotation speed of 150 rpm for 20 minutes.

The obtained kneaded product was molded, to produce a molded body.

Using a multistage hot air drier (available from Shichiyo Co., Ltd., a rack type oven), the molded body was dried at 120 degrees C. for 3 hours, and further at 150 degrees C. for 2 hours.

Next, the dried molded body was ground with a pneumatic ultra-fine grinder (a selenium mirror available from Masuko Sangyo Co., Ltd.), such that the median diameter would be 400 micrometers.

The median diameter was measured with MASTER SIZER 2000 (available from Malvern Instruments).

The ground powder was sieved with a classifier (available from Tsukasa Industry Co., Ltd., a vibration screen), to remove (cut) particles less than 150 micrometers and greater than 850 micrometers, in order to only use particles having a particle diameter in a range of from 150 micrometers through 850 micrometers.

In this way, a granulated product 1 was obtained and used as a water-purifying agent 1.

<Dispersion Liquid>

To the water-purifying agent 1, water having an electrical conductivity of 110 microsiemenses/cm$^3$ (tap water in Kanuma City, Tochigi Prefecture) was added such that the solid content would be 0.1% by mass, and then the resultant was stirred, to obtain a dispersion liquid 1.

The viscosity of the dispersion liquid 1 and the median diameter of the solid in the dispersion liquid were measured by the methods described above.

<Evaluation of Properties>

The dispersion liquid 1 was filled in an amount of 180 L in an open-type drum having a capacity of 200 L.

After the dispersion liquid 1 was left to stand in a dark place at 23 degrees C. for a predetermined time, the lid of the drum was removed to visually observe presence or absence of settling.

Next, the dispersion liquid 1 containing the water-purifying agent 1 was added to the wastewater such that the solid content would be 7 mg/L, and the resultant was stirred. Here, as the method for measuring the "solid content", the solid content can be obtained by back calculation from a slurry concentration in the wastewater measured with a moisture meter.

The wastewater to which the dispersion liquid 1 was added was transferred to a settling tank, and then left to stand still with a visual observation of the state every hour.

The timing at which separation into two phases, namely a supernatant and a precipitate was apparently confirmed was measured as a settling time.

The supernatant was picked to measure the ion concentration with LAMBDA (Λ) 9000 (available from Kyoritsu Chemical-Check Lab., Corp.).

Based on the result, the water-purifying performance was evaluated according to the criteria described above.

[Evaluation Criteria for Water-Purifying Performance]

A: Lower than 1.0 mg/L (equal to or lower than the limit of detection)

B: 1.0 mg/L or higher but lower than 1.4 mg/L

BC: 1.4 mg/L or higher but lower than 1.7 mg/L

C: 1.7 mg/L or higher but lower than 2.0 mg/L

D: 2.0 mg/L or higher

The evaluation results of Example 1 are presented in Table 1-1.

In Table 1-1, the plant powder 1 represents *Corchorus olitorius* (produced in China, Guangzhou), and PAM represents polyacrylamide (the same applies in Table 1-2 to Table 1-5).

Example 2

A water-purifying agent 2 was produced in the same manner as in Example 1, except that unlike in Example 1, "intermediate jute No. 3", which was *Corchorus olitorius* having an identification number in Institute of Bast Fiber Crops, Chinese Academy of Agricultural Sciences, i.e., varieties identification of registration No. 1209006 in Anhui province, was used as a plant.

Using a dispersion liquid 2 obtained by dispersing the water-purifying agent 2 in water, the properties of the dispersion liquid for water purification were evaluated in the same manners as in Example 1. The evaluation results of Example 2 are presented in Table 1-1. In Table 1-1, the plant powder 2 represents "intermediate jute No. 3".

Example 3

A water-purifying agent 3 was produced in the same manner as in Example 2, except that unlike in Example 2, "intermediate jute No. 4", which was *Corchorus olitorius* having an identification number, 2013, in Institute of Bast Fiber Crops, Chinese Academy of Agricultural Sciences, was used as a plant.

Using a dispersion liquid 3 obtained by dispersing the water-purifying agent 3 in water, the properties of the dispersion liquid for water purification were evaluated in the same manners as in Example 1. The evaluation results of Example 3 are presented in Table 1-1. In Table 1-1, the plant powder 3 represents "intermediate jute No. 4".

Example 4

A water-purifying agent 4 was produced in the same manner as in Example 3, except that unlike in Example 3, "intermediate kenaf", which was *Corchorus olitorius* having an identification number in Institute of Bast Fiber Crops, Chinese Academy of Agricultural Sciences, i.e., varieties identification of registration No. 1209001 in Anhui province, was used as a plant.

Using a dispersion liquid 4 obtained by dispersing the water-purifying agent 4 in water, the properties of the dispersion liquid for water purification were evaluated in the same manners as in Example 1. The evaluation results of Example 4 are presented in Table 1-1. In Table 1-1, the plant powder 4 represents "intermediate kenaf.

Comparative Example 1

A comparative water-purifying agent 1 was produced in the same manner as in Example 3, except that unlike in Example 3, the dispersion liquid concentration was changed to 0.005% by mass and the viscosity was adjusted to 15 mPa·S.

Using a comparative dispersion liquid 1 obtained by dispersing the comparative water-purifying agent 1 in water, the properties of the dispersion liquid for water purification were evaluated in the same manners as in Example 1. The evaluation results of Comparative Example 1 are presented in Table 1-2.

As for the result of settling being "present" in the drum in Comparative Example 1, the bottom of the drum was unseeable due to a precipitate.

Example 5

A water-purifying agent 5 was produced in the same manner as in Example 3, except that unlike in Example 3, the dispersion liquid concentration was changed to 0.02% by mass and the viscosity was adjusted to 20 mPa·S.

Using a dispersion liquid 5 obtained by dispersing the water-purifying agent 5 in water, the properties of the dispersion liquid for water purification were evaluated in the same manners as in Example 1. The evaluation results of Example 5 are presented in Table 1-2.

As for the result of settling being "slightly present" in the drum in Example 5, a precipitate was observed but the bottom of the drum was seeable.

Example 6

A water-purifying agent 6 was produced in the same manner as in Example 3, except that unlike in Example 3, the dispersion liquid concentration was changed to 0.5% by mass and the viscosity was adjusted to 500 mPa·S.

Using a dispersion liquid 6 obtained by dispersing the water-purifying agent 6 in water, the properties of the dispersion liquid for water purification were evaluated in the same manners as in Example 1. The evaluation results of Example 6 are presented in Table 1-2.

Comparative Example 2

A comparative water-purifying agent 2 was produced in the same manner as in Example 3, except that unlike in Example 3, the dispersion liquid concentration was changed to 0.6% by mass and the viscosity was adjusted to 600 mPa·S.

Using a comparative dispersion liquid 2 obtained by dispersing the comparative water-purifying agent 2 in water, the properties of the dispersion liquid for water purification were evaluated in the same manners as in Example 1. The evaluation results of Comparative Example 2 are presented in Table 1-2.

Example 7

A water-purifying agent 7 was produced in the same manner as in Example 3, except that unlike in Example 3, the dispersion liquid concentration was changed to 0.08% by mass and the viscosity was adjusted to 150 mPa·S.

Using a dispersion liquid 7 obtained by dispersing the water-purifying agent 7 in water, the properties of the dispersion liquid for water purification were evaluated in the same manners as in Example 1. The evaluation results of Example 7 are presented in Table 1-2.

Example 8

A water-purifying agent 8 was produced in the same manner as in Example 3, except that unlike in Example 3, the dispersion liquid concentration was changed to 0.4% by mass and the viscosity was adjusted to 450 mPa·S.

Using a dispersion liquid 8 obtained by dispersing the water-purifying agent 8 in water, the properties of the dispersion liquid for water purification were evaluated in the same manners as in Example 1. The evaluation results of Example 8 are presented in Table 1-2.

Comparative Example 3

A comparative water-purifying agent 3 was produced in the same manner as in Example 3, except that unlike in Example 3, the sieving condition for classification after a dried product of the plant was ground was changed to adjust the median diameter of the solid in the dispersion liquid to 80 micrometers.

Using a comparative dispersion liquid 3 obtained by dispersing the comparative water-purifying agent 3 in water, the properties of the dispersion liquid for water purification were evaluated in the same manners as in Example 1. The evaluation results of Comparative Example 3 are presented in Table 1-3.

Example 9

A water-purifying agent 9 was produced in the same manner as in Example 3, except that unlike in Example 3, the sieving condition for classification after a dried product of the plant was ground was changed to adjust the median diameter of the solid in the dispersion liquid to 120 micrometers.

Using a dispersion liquid 9 obtained by dispersing the water-purifying agent 9 in water, the properties of the dispersion liquid for water purification were evaluated in the same manners as in Example 1. The evaluation results of Example 9 are presented in Table 1-3.

Comparative Example 4

A comparative water-purifying agent 4 was produced in the same manner as in Example 3, except that unlike in Example 3, classification was not performed after a dried product of the plant was ground.

Using a comparative dispersion liquid 4 obtained by dispersing the comparative water-purifying agent 4 in water, the properties of the dispersion liquid for water purification were evaluated in the same manners as in Example 1. The evaluation results of Comparative Example 4 are presented in Table 1-3.

Referential Example 1

Using the comparative water-purifying agent 4 produced in Comparative Example 4, the properties of the dispersion liquid for water purification were evaluated in the same manners as in Example 1. However, in Referential Example 1, the time for being left to stand in the drum was changed to one day (24 hours). The evaluation results of Referential Example 1 are presented in Table 1-3.

Example 10

A water-purifying agent 10 was produced in the same manner as in Example 3, except that unlike in Example 3, the sieving condition for classification after a dried product of the plant was ground was changed to adjust the median diameter of the solid in the dispersion liquid to 150 micrometers.

Using a dispersion liquid 10 obtained by dispersing the water-purifying agent 10 in water, the properties of the dispersion liquid for water purification were evaluated in the same manners as in Example 1. The evaluation results of Example 10 are presented in Table 1-3.

Example 11

A water-purifying agent 11 was produced in the same manner as in Example 3, except that unlike in Example 3, the sieving condition for classification after a dried product of the plant was ground was changed to adjust the median diameter of the solid in the dispersion liquid to 350 micrometers.

Using a dispersion liquid 11 obtained by dispersing the water-purifying agent 11 in water, the properties of the dispersion liquid for water purification were evaluated in the same manners as in Example 1. The evaluation results of Example 11 are presented in Table 1-3.

Example 12

A dispersion liquid 12 was produced in the same manner as in Example 3, except that unlike in Example 3, the water for the dispersion liquid was changed to water having an electrical conductivity of 198 microsiemenses/cm (tap water in Kanuma City, Tochigi Prefecture).

Using the dispersion liquid 12, the properties of the dispersion liquid for water purification were evaluated in the same manners as in Example 1. The evaluation results of Example 12 are presented in Table 1-4.

Example 13

A dispersion liquid 13 was produced in the same manner as in Example 3, except that unlike in Example 3, the water for the dispersion liquid was changed to water having an electrical conductivity of 30 microsiemenses/cm, which was obtained by blending tap water in Kanuma City, Tochigi Prefecture with distilled water in appropriate amounts.

Using the dispersion liquid 13, the properties of the dispersion liquid for water purification were evaluated in the same manners as in Example 1. The evaluation results of Example 13 are presented in Table 1-4.

Example 14

A water-purifying agent 14 was produced in the same manner as in Example 3, except that unlike in Example 3, classification of the kneaded product of the plant and the polymeric flocculant was not performed.

Using a dispersion liquid 14 obtained by dispersing the water-purifying agent 14 in water, the properties of the dispersion liquid for water purification were evaluated in the same manners as in Example 1. The evaluation results of Example 14 are presented in Table 1-4.

Example 15

A water-purifying agent 15 was produced in the same manner as in Example 3, except that unlike in Example 3, polyamine was used instead of polyacrylamide.

Using a dispersion liquid 15 obtained by dispersing the water-purifying agent 15 in water, the properties of the dispersion liquid for water purification were evaluated in the same manners as in Example 1. The evaluation results of Example 15 are presented in Table 1-4.

Example 16

A dispersion liquid 16 was produced in the same manner as in Example 3, except that unlike in Example 3, the water for the dispersion liquid was changed to water having an electrical conductivity of 1 microsiemens/cm (distilled water).

Using the dispersion liquid 16, the properties of the dispersion liquid for water purification were evaluated in the same manners as in Example 1. The evaluation results of Example 16 are presented in Table 1-4.

Example 17

A dispersion liquid 17 was produced in the same manner as in Example 3, except that unlike in Example 3, a granulated product was not produced, but a polymeric flocculant and a plant powder were used separately and dispersed separately in water and distilled water was used as the water for the dispersion liquid.

Using the dispersion liquid 17, the properties of the dispersion liquid for water purification were evaluated in the same manners as in Example 1. The evaluation results of Example 17 are presented in Table 1-4.

Example 18

Potassium fluoride was dissolved in pure water, to produce an aqueous solution (800 g) containing fluorine ion (2,500 mg/L) as wastewater to be used for experiment (virtual wastewater).

Next, calcium chloride (8.6 mg/L) was added to the wastewater and the resultant was stirred while adding sodium hydroxide to adjust pH to from 7.5 through 9.0, to insolubilize fluorine. As a result of this operation, the fluorine aqueous solution was separated into a supernatant containing microflocs and a precipitate.

At the instant, the ion concentration in the supernatant of the wastewater was 10 mg/L.

Using the dispersion liquid 3, which was obtained by dispersing the water-purifying agent 3 in water, in the same manner as in Example 3 except that the wastewater described above was used, the properties of the dispersion liquid for water purification were evaluated. The evaluation results of Example 18 are presented in Table 1-5.

Example 19

Ferric chloride hexahydrate was dissolved in pure water, to produce an aqueous solution (800 g) containing iron ion (200 mg/L) as wastewater to be used for experiment (virtual wastewater).

Next, the wastewater was stirred while adding sodium hydroxide to adjust pH to from 6.5 through 9.0, to insolubilize iron.

At the instant, the ion concentration in the supernatant of the wastewater was 2 mg/L.

Using the dispersion liquid 3, which was obtained by dispersing the water-purifying agent 3 in water, in the same manner as in Example 3 except that the wastewater described above was used, the properties of the dispersion liquid for water purification were evaluated. The evaluation results of Example 19 are presented in Table 1-5.

Example 20

Copper sulfate pentahydrate was dissolved in pure water, to produce an aqueous solution (800 g) containing copper ion (100 mg/L) as wastewater to be used for experiment (virtual wastewater).

Next, the wastewater was stirred while adding sodium hydroxide to adjust pH to from 7.0 through 8.0, to insolubilize copper.

At the instant, the ion concentration in the supernatant of the wastewater was 2 mg/L.

Using the dispersion liquid 3, which was obtained by dispersing the water-purifying agent 3 in water, in the same manner as in Example 3 except that the wastewater described above was used, the properties of the dispersion liquid for water purification were evaluated. The evaluation results of Example 20 are presented in Table 1-5.

Example 21

Zinc nitrate hexahydrate was dissolved in pure water, to produce an aqueous solution (800 g) containing zinc ion (100 mg/L) as wastewater to be used for experiment (virtual wastewater).

Next, the wastewater was stirred while adding sodium hydroxide to adjust pH to from 9.0 through 9.5, to insolubilize zinc.

At the instant, the ion concentration in the supernatant of the wastewater was 5 mg/L.

Using the dispersion liquid 3, which was obtained by dispersing the water-purifying agent 3 in water, in the same manner as in Example 3 except that the wastewater described above was used, the properties of the dispersion liquid for water purification were evaluated. The evaluation results of Example 21 are presented in Table 1-5.

Example 22

Potassium dichromate was dissolved in pure water, to produce an aqueous solution (800 g) containing chromium ion (100 mg/L) as wastewater to be used for experiment (virtual wastewater).

Next, the wastewater was stirred while adding sodium hydroxide to adjust pH to from 6.0 through 7.5, to insolubilize chromium.

At the instant, the ion concentration in the supernatant of the wastewater was 5 mg/L.

Using the dispersion liquid 3, which was obtained by dispersing the water-purifying agent 3 in water, in the same manner as in Example 3 except that the wastewater described above was used, the properties of the dispersion liquid for water purification were evaluated. The evaluation results of Example 22 are presented in Table 1-5.

Example 23

Diarsenic trioxide was dissolved in pure water, to produce an aqueous solution (800 g) containing arsenic ion (10 mg/L) as wastewater to be used for experiment (virtual wastewater).

Next, ferric chloride (65 mg/L) and calcium chloride (354 mg/L) were added to the wastewater, and then while adding sodium hydroxide to adjust pH to from 8.0 through 9.5, the resultant was stirred to insolubilize arsenic.

At the instant, the ion concentration in the supernatant of the wastewater was 0.05 mg/L.

Using the dispersion liquid 3, which was obtained by dispersing the water-purifying agent 3 in water, in the same manner as in Example 3 except that the wastewater described above was used, the properties of the dispersion liquid for water purification were evaluated. The evaluation results of Example 23 are presented in Table 1-5.

However, in Example 23, after the settling time was measured in the same manner as in Example 3, the supernatant was picked and concentrated with an evaporator such that the volume would be 1/100, and subsequently, the ion concentration was measured. As for the arsenic ion, the evaluation was the grade A, judging that an ion concentration of 0.01 mg/L or lower was a preferable result.

TABLE 1-1

| Item | Ex. 1 | Ex. 2 | Ex. 3 | Ex. 4 |
|---|---|---|---|---|
| Plant powder | 1 | 2 | 3 | 4 |
| Polymeric flocculant | PAM | PAM | PAM | PAM |
| Blending ratio by mass (plant powder/polymeric flocculant) | 50/50 | 50/50 | 50/50 | 50/50 |
| Concentration of dispersion liquid (% by mass) | 0.1 | 0.1 | 0.1 | 0.1 |
| Viscosity of dispersion liquid (mPa · sec at 23 degrees C.) | 150 | 200 | 250 | 200 |
| Median diameter of solid in dispersion liquid (micrometer) | 250 | 250 | 250 | 250 |
| Presence/absence of classification of plant powder | Present | Present | Present | Present |
| Presence/absence of classification of kneaded product of plant and polymeric flocculant | Present | Present | Present | Present |
| Electrical conductivity of water of dispersion liquid (microsiemens/cm) | 110 | 110 | 110 | 110 |
| Time for being left to stand in drum (Day) | 30 | 30 | 30 | 30 |
| Presence/absence of precipitation of solid | Absent | Absent | Absent | Absent |
| Target ion | Ni | Ni | Ni | Ni |
| Settling time (hour) | 96< | 96< | 96< | 96< |
| Water-purifying performance (after 96 hours) | BC | B | A | B |

TABLE 1-2

| Item | Comp. Ex. 1 | Ex. 5 | Ex. 6 | Comp. Ex. 2 | Ex. 7 | Ex. 8 |
|---|---|---|---|---|---|---|
| Plant powder | 3 | 3 | 3 | 3 | 3 | 3 |
| Polymeric flocculant | PAM | PAM | PAM | PAM | PAM | PAM |
| Blending ratio by mass (plant powder/polymeric flocculant) | 50/50 | 50/50 | 50/50 | 50/50 | 50/50 | 50/50 |
| Concentration of dispersion liquid (% by mass) | 0.005 | 0.02 | 0.5 | 0.6 | 0.08 | 0.4 |
| Viscosity of dispersion liquid (mPa · sec at 23 degrees C.) | 15 | 20 | 500 | 600 | 150 | 450 |
| Median diameter of solid in dispersion liquid (micrometer) | 250 | 250 | 250 | 250 | 250 | 250 |
| Presence/absence of classification of plant powder | Present | Present | Present | Present | Present | Present |
| Presence/absence of classification of kneaded product of plant and polymeric flocculant | Present | Present | Present | Present | Present | Present |
| Electrical conductivity of water of dispersion liquid (microsiemens/cm) | 110 | 110 | 110 | 110 | 110 | 110 |
| Time for being left to stand in drum (Day) | 30 | 30 | 30 | 30 | 30 | 30 |
| Presence/absence of precipitation of solid | Present | Slightly present | Absent | Absent | Absent | Absent |
| Target ion | Ni | Ni | Ni | Ni | Ni | Ni |
| Settling time (hour) | 60 | 96< | 96< | 96< | 96< | 96< |
| Water-purifying performance (after 96 hours) | D | C | BC | D | A | A |

TABLE 1-3

| Item | Comp. Ex. 3 | Ex. 9 | Comp. Ex. 4 | Ref. Ex. 1 | Ex. 10 | Ex. 11 |
|---|---|---|---|---|---|---|
| Plant powder | 3 | 3 | 3 | 3 | 3 | 3 |
| Polymeric flocculant | PAM | PAM | PAM | PAM | PAM | PAM |
| Blending ratio by mass (plant powder/polymeric flocculant) | 50/50 | 50/50 | 50/50 | 50/50 | 50/50 | 50/50 |
| Concentration of dispersion liquid (% by mass) | 0.1 | 0.1 | 0.1 | 0.1 | 0.1 | 0.1 |
| Viscosity of dispersion liquid (mPa · sec at 23 degrees C.) | 250 | 250 | 250 | 250 | 250 | 250 |

TABLE 1-3-continued

| Item | Comp. Ex. 3 | Ex. 9 | Comp. Ex. 4 | Ref. Ex. 1 | Ex. 10 | Ex. 11 |
|---|---|---|---|---|---|---|
| Median diameter of solid in dispersion liquid (micrometer) | 80 | 120 | 420 | 420 | 150 | 350 |
| Presence/absence of classification of plant powder | Present | Present | Absent | Absent | Present | Present |
| Presence/absence of classification of kneaded product of plant and polymeric flocculant | Present | Present | Present | Present | Present | Present |
| Electrical conductivity of water of dispersion liquid (microsiemens/cm) | 110 | 110 | 110 | 110 | 110 | 110 |
| Time for being left to stand in drum (Day) | 30 | 30 | 30 | 1 | 30 | 30 |
| Presence/absence of precipitation of solid | Absent | Absent | Present | Absent | Absent | Absent |
| Target ion | Ni | Ni | Ni | Ni | Ni | Ni |
| Settling time (hour) | 60 | 96< | 96< | 96< | 96< | 96< |
| Water-purifying performance (after 96 hours) | D | C | D | A | A | A |

TABLE 1-4

| Item | Ex. 12 | Ex. 13 | Ex. 14 | Ex. 15 | Ex. 16 | Ex. 17 |
|---|---|---|---|---|---|---|
| Plant powder | 3 | 3 | 3 | 3 | 3 | 3 |
| Polymeric flocculant | PAM | PAM | PAM | Polyamine | PAM | PAM |
| Blending ratio by mass (plant powder/polymeric flocculant) | 50/50 | 50/50 | 50/50 | 50/50 | 50/50 | 50/50 |
| Concentration of dispersion liquid (% by mass) | 0.1 | 0.1 | 0.1 | 0.1 | 0.1 | 0.1 |
| Viscosity of dispersion liquid (mPa · sec at 23 degrees C.) | 150 | 300 | 65 | 50 | 400 | 100 |
| Median diameter of solid in dispersion liquid (micrometer) | 250 | 250 | 250 | 250 | 250 | 300 |
| Presence/absence of classification of plant powder | Present | Present | Present | Present | Present | Present |
| Presence/absence of classification of kneaded product of plant and polymeric flocculant | Present | Present | Absent | Present | Present | — |
| Electrical conductivity of water of dispersion liquid (microsiemens/cm) | 198 | 30 | 110 | 110 | 1 | 1 |
| Time for being left to stand in drum (Day) | 30 | 30 | 30 | 30 | 30 | 30 |
| Presence/absence of precipitation of solid | Absent | Absent | Slightly present | Slightly present | Absent | Slightly present |
| Target ion | Ni | Ni | Ni | Ni | Ni | Ni |
| Settling time (hour) | 60 | 96< | 70 | 65 | 96< | 90 |
| Water-purifying performance (after 96 hours) | B | A | C | C | A | C |

TABLE 1-5

| Item | Ex. 18 | Ex. 19 | Ex. 20 | Ex. 21 | Ex. 22 | Ex. 23 |
|---|---|---|---|---|---|---|
| Plant powder | 3 | 3 | 3 | 3 | 3 | 3 |
| Polymeric flocculant | PAM | PAM | PAM | PAM | PAM | PAM |
| Blending ratio by mass (plant powder/polymeric flocculant) | 50/50 | 50/50 | 50/50 | 50/50 | 50/50 | 50/50 |
| Concentration of dispersion liquid (% by mass) | 0.1 | 0.1 | 0.1 | 0.1 | 0.1 | 0.1 |
| Viscosity of dispersion liquid (mPa · sec at 23 degrees C.) | 250 | 250 | 250 | 250 | 250 | 250 |
| Median diameter of solid in dispersion liquid (micrometer) | 250 | 250 | 250 | 250 | 250 | 250 |
| Presence/absence of classification of plant powder | Present | Present | Present | Present | Present | Present |
| Presence/absence of classification of kneaded product of plant and polymeric flocculant | Present | Present | Absent | Present | Present | Present |
| Electrical conductivity of water of dispersion liquid (microsiemens/cm) | 110 | 110 | 110 | 110 | 110 | 110 |
| Time for being left to stand in drum (Day) | 30 | 30 | 30 | 30 | 30 | 30 |
| Presence/absence of precipitation of solid | Absent | Absent | Absent | Absent | Absent | Absent |
| Target ion | F | Fe | Cu | Zn | Cr | As |
| Settling time (hour) | 96< | 96< | 96< | 96< | 96< | 96< |
| Water-purifying performance (after 96 hours) | A | A | A | A | A | A |

From the results of Examples 1 to 23, it was confirmed that the dispersion liquid for water purification of the present invention was a dispersion liquid for water purification that was able to exhibit an excellent water-purifying performance, did not undergo water-purifying performance degradation even after a long term of storage, and was able to satisfy cost saving.

The invention claimed is:

1. A dispersion liquid for water purification, comprising:
   water;
   a powder of *Corchorus olitorius*; and
   a polymeric flocculant,
   wherein the powder of *Corchorus olitorius* and the polymeric flocculant are contained in a total amount of from 0.05% by mass through 0.4% by mass relative to the water,
   wherein the water has an electrical conductivity of 1 microsiemenses/cm to 110 microsiemenses/cm,
   wherein the dispersion liquid for water purification has a viscosity of from 150 mPa·S through 450 mPa·S, and
   wherein a median diameter of all solids in the dispersion liquid for water purification is from 150 micrometers through 400 micrometers.

2. The dispersion liquid for water purification according to claim 1,
   wherein the polymeric flocculant is polyacrylamide.

3. The dispersion liquid for water purification according to claim 1,
   wherein a composition ratio by mass between the *Corchorus olitorius* and the polymeric flocculant is from 9:1 through 1:9.

4. A method for producing the dispersion liquid for water purification according to claim 1, the method comprising:
   producing a powder of the water-purifying agent by:
     mixing the powder of the *Corchorus olitorius* and the polymeric flocculant with each other, and kneading a resultant with addition of water, to obtain a kneaded product;
     molding the kneaded product, to form a molded body;
     drying the molded body, to obtain a dried product; and
     grinding the dried product, and
   dispersing the powder of a water-purifying agent in water to produce the dispersion liquid for water purification.

5. The method according to claim 4,
   wherein the water used for the dispersing has an electrical conductivity of 30 microsiemenses/cm to 110 microsiemenses/cm.

6. The method according to claim 4,
   wherein the method further comprises a classifying step of classifying the granulated product with a sieve after the grinding step.

7. A wastewater treatment method, comprising:
   feeding the dispersion liquid for water purification according to claim 1 to wastewater, to thereby remove an inorganic substance in the wastewater.

8. The wastewater treatment method according to claim 7,
   wherein the inorganic substance comprises at least any one selected from the group consisting of nickel, fluorine, iron, copper, zinc, chromium, arsenic, cadmium, tin, and lead.

9. The wastewater treatment method according to claim 8,
   further comprising storing the dispersion liquid for water purification for 24 hours or longer,
   wherein the dispersion liquid for water purification is fed to the wastewater after the storing.

10. The wastewater treatment method according to claim 7,
    wherein the method produces a purified water having Ni ions in a concentration of equal to or lower than a limit of detection.

* * * * *